United States Patent
Ward

(10) Patent No.: US 6,596,943 B1
(45) Date of Patent: Jul. 22, 2003

(54) CABLES

(75) Inventor: Andrew Martin Rober Ward, Cambridge (GB)

(73) Assignee: AT&T Laboratories-Cambridge Ltd. (GB)

(*) Notice: Subject to any disclaimer, the term of this patent is extended or adjusted under 35 U.S.C. 154(b) by 0 days.

(21) Appl. No.: 09/294,557

(22) Filed: Apr. 20, 1999

(30) Foreign Application Priority Data

Apr. 20, 1998 (GB) .............................................. 9808326

(51) Int. Cl.⁷ ................................................. H01B 7/36
(52) U.S. Cl. ...................................................... 174/112
(58) Field of Search ........................ 174/112; 116/207, 116/200, 211, 216; 324/500, 541, 543; 439/59, 74; 313/506, 511

(56) References Cited

U.S. PATENT DOCUMENTS

| | | | | |
|---|---|---|---|---|
| 3,069,579 A | * | 12/1962 | Berg et al. .................. | 313/511 |
| 4,661,305 A | * | 4/1987 | Carlomagno ................. | 156/277 |
| 5,416,622 A | * | 5/1995 | Engfer et al. ................. | 359/88 |
| 5,468,914 A | * | 11/1995 | Falciglia et al. ............. | 174/112 |
| 5,657,037 A | * | 8/1997 | Okada et al. ................. | 345/94 |
| 5,869,930 A | * | 2/1999 | Baumberg et al. .......... | 313/506 |
| 5,900,275 A | * | 5/1999 | Cronin et al. ............... | 427/108 |
| 5,922,996 A | * | 7/1999 | Ryeczek ..................... | 174/112 |

FOREIGN PATENT DOCUMENTS

DE     OS 3 742 412     6/1989

* cited by examiner

Primary Examiner—Chau N. Nguyen
(74) Attorney, Agent, or Firm—Wolf, Greenfield & Sacks, P.C.

(57) ABSTRACT

A cable 2 has an outer sheath on which a layer of selectively activatable material such as a layer of thick-film conductive polymer is sprayed to form a resistive element. A layer of thermochromic ink is printed on top of this. Electric current passed through the resistive element provides heating to the ink and causes it to warm and change color.

14 Claims, 2 Drawing Sheets

CABLES

RELATED APPLICATIONS

This application claims priority from UK Patent Application No. 9808326.4 filed Apr. 20, 1998, the subject matter of which is incorporated herein by reference.

FIELD OF THE INVENTION

This invention relates to cables such as electric and fibre optic cables.

BACKGROUND

Cables carrying power and data are commonplace, and furthermore, the widespread introduction of computing and communication devices is rapidly increasing the need for copper and fibre interconnections. As the density of these devices increases, managing the cables becomes a problem. Wires can wrap around each other in a mess, or disappear into a bundle in the wall. Trying to find which wire is which at the other end is extremely difficult. Different coloured cables can help, as can labelling the cable ends. That, however, is of little use when hundreds of wires are in close proximity.

SUMMARY OF THE INVENTION

We have appreciated that there is a need for cables that can be controlled to change their appearance and thus stand out from the crowd when necessary. This may be by changing colour or emitting light. Thermochromic or electroluminescent materials embedded in the cable could be activated to indicate the path of a particular wire or fibre. Tracing the route of a cable through a building would then be as simple as clipping a test probe to one end and following the light. Alternatively, specialised connectors would allow computers to selectively illuminate cables, to help users plug peripherals into PC's, to show the path taken by data between devices, and to indicate the network faults that show levels of network congestion in particular cables.

A preferred embodiment of the invention will now be described in detail by way of example with reference to the accompanying drawings, in which:

DRAWINGS

DETAILED DESCRIPTION

Figure 1:
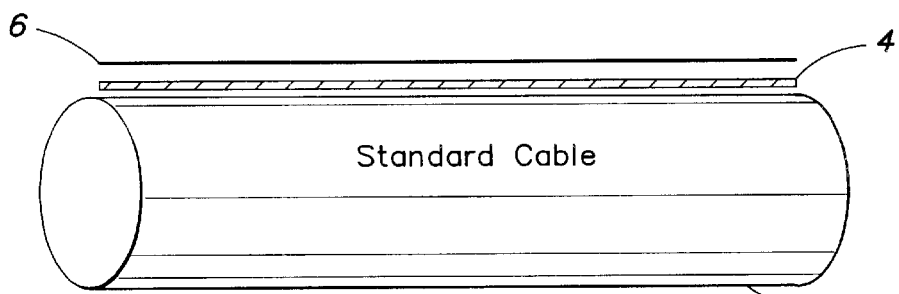
FIG. 1 shows a first cable embodying the invention.

The cable 2 shown in FIG. 1 is a standard cable with a core of either copper or optical fibre and may be multi-cored and/or shielded. A layer of thick-film conductive polymer 4 is sprayed onto the outer sheath of the cable to form a resistive element, the layer 4 also sometimes being referred to hereinafter as a polymer resistive element. On top of this, a layer of thermochromic ink 6 is printed. When electric current is passed through the resistive element, it heats up and warms the thermochromic ink. This in turn changes colour. When the current is switched off, the resistive element cools down, as does the thermochromic ink, which reverts to its normal colour. The thermochromic ink can be printed on top of the resistive element in any pattern; this may be as simple as a strip, or it may be letters, numerals or other symbols.

The material, to display the change in appearance, may be thermochromic, electrochromic, electroluminescent or any other material which changes its appearance. Electrochromic materials change their colour when electric current is passed through them. Electroluminescent materials give off light when electric current is passed through them and thermochromic materials change colour when heated.

Although FIG. 1 shows the basic principle of the cable, in practice, the implementation must be slightly different. Two characteristics of the cable are desirable; first the cable should be designed such that it may be energized from both ends; and second, it should be possible to cut any length of cable from a continuous reel and obtain an operative piece of cable. This second characteristic requires that the design of the cable should be invariant with length.

Figure 2:
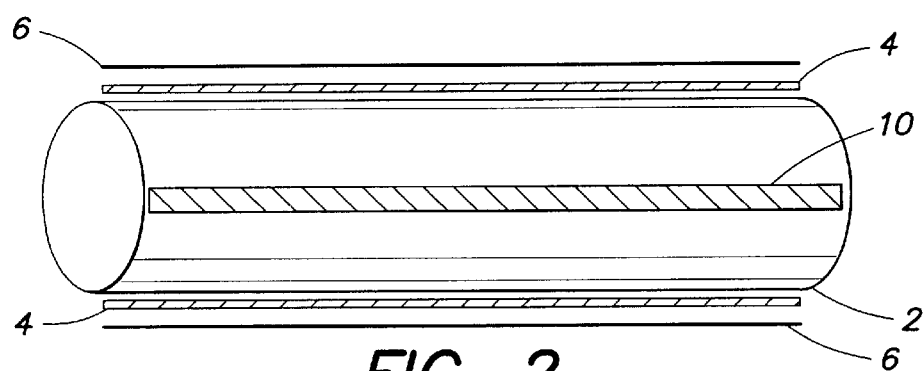
FIG. 2 shows a second cable embodying the invention.

Accordingly, the design shown in FIG. 2 has been proposed. As can be seen, the cable construction is the same at all points along its length. However, to pass current through the resistive elements 4, the circuit must be completed. To make the circuit, a further low-resistance thick-film conductive polymer element 10 is provided on the cable.

Figure 3:
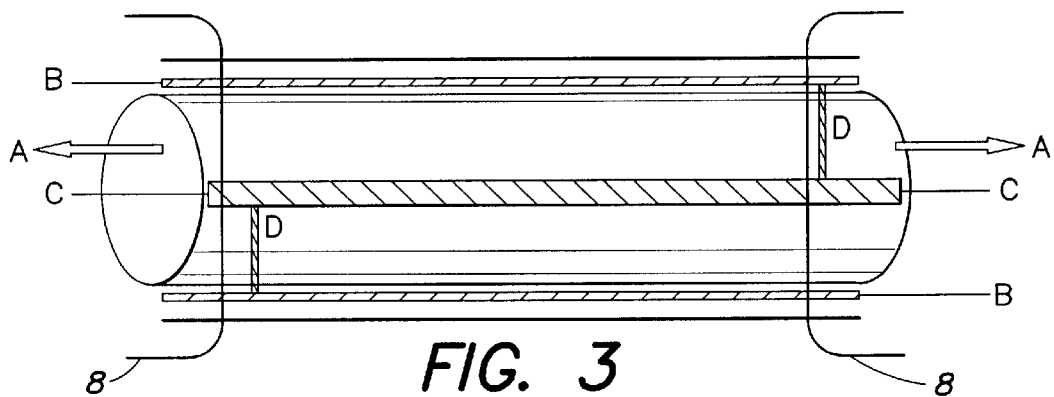
FIG. 3 shows the cable of FIG. 2 with connectors at either end.

In this embodiment the circuit is completed through a low resistance return path when suitable connectors 8 are attached to the ends of the cable as shown in FIG. 3.

The connectors perform their normal task of terminating the standard cable inner for whatever data or power purpose the cable is used (A), but have two more pins (B and C) and a connecting bar (D). Pins B and C and the connecting bar D connect the thick-film polymer resistive element to the low-resistance thick-film polymer element, possibly by pushing into the layer. As can be seen, the connecting bar of the left-hand connector completes a circuit between pins B and C of the right-hand connector. By symmetry, the connecting bar of the right-hand connector completes a circuit between pins B and C of the left-hand connector. Test probes which include a current source can be attached across pins B and C of either or both connectors to pass current through the thick-film polymer resistive element and thereby to change the colour of either or both of the thermochromic strips in the desired way.

Alternatively, any devices to which the cable is connected by one of the connectors may change the colour of one of the strips by passing the current between pins B and C of the appropriate connector. It should be noted that the final design of the cable will include some visual means of indicating the position of the low-resistance polymer element so that pin C can be aligned with it, to connect it to the cable, thus allowing the same connector to be used at both ends as shown in the figure.

Figure 4:
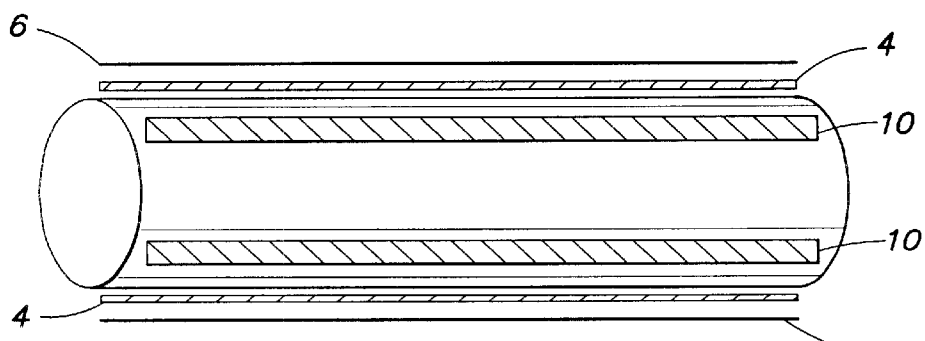
FIG. 4 shows a third embodiment of the invention.

In some circumstances it may be undesirable to have pins C of the two connectors joined by a low-resistance path since this can lead to ground loops between devices. An alternative cable design which avoids this problem is, therefore, shown in FIG. 4. In this, two strips of thermochromic ink 6 are provided on opposite sides of the cable, each being positioned on top of a thick film polymer resistive layer or element 4 in the manner shown in relation to FIGS. 2 and 3. Adjacent to each of these thick film polymer resistive elements are low-resistance thick film polymer elements 10.

Figure 5:
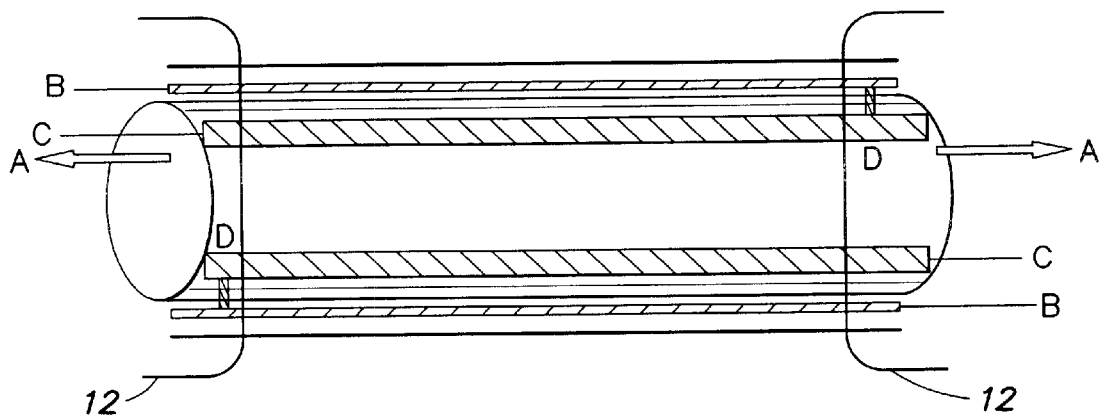
FIG. 5 shows the cable of FIG. 4 with the connectors at either end.

The cable is shown connected to connectors 12 in FIG. 5.

As can be seen, the connecting bars at each end still complete the circuit for the other connector, but each connector (and any device connected to it) is isolated from the connector at the other end of the cable (and any device connected to it). Thus, the uppermost polymer resistive elements 4, 10 are contacted in the left-hand connector by pins B and C across which a current source can be placed. In the right-hand connector the two corresponding elements 4, 10 are connected together by the connecting bar D thus completing the circuit. The lowermost resistive elements are connected in a similar manner with the connecting bar in the left-hand connector completing a circuit between pins B and C in the right-hand connector.

In some circumstances it may not be necessary to change the colour of an energized cable over its entire length. In fact, this may be undesirable as it may be necessary to apply a high voltage to do so. This could, of course, put personnel at risk and increase fire hazards.

Figure 6:
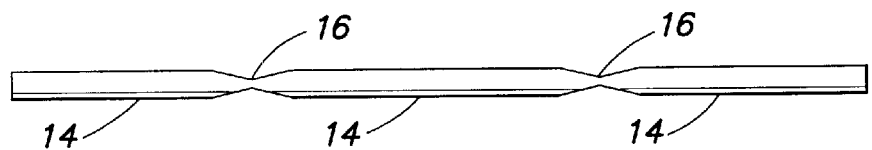
FIG. 6 shows a pattern for a resistive strip to be applied to a cable embodying the invention.

Instead of this, the resistive strip can be designed to heat up the thermochromic material at spaced intervals as shown in FIG. 6. This is a view of the thick-film resistive element viewed from above. It comprises repeated wide areas 14 of resistive strip interspersed with constricted areas 16. The wide areas 14 have relatively low resistance and are not heated significantly by the current passing through them. At the constructions, however, the resistance of the strip increases significantly and heat is generated at these points, thereby warming the thermochromic material above it and changing its colour. Since the majority of the resistive strip has a relatively low resistance, the voltage required to change the colour of the thermochromic ink above the constrictions along the length of the cable is low.

The thermochromic and resistive strips may be applied to the cable in a spiral pattern in order to increase the visibility of the cable in the energized state.

Figure 7:
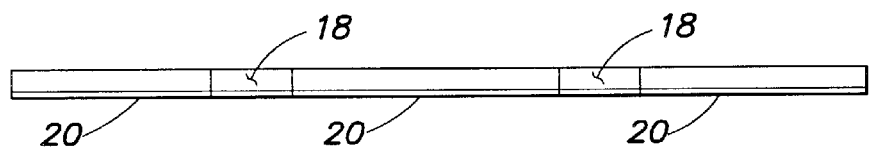
FIG. 7 shows a further pattern of resistive strip to be applied to a cable embodying the invention.

An alternative implementation uses an electrochromic or electroluminescent strip in place of the resistive element and thermochromic strip arrangement. Again, to reduce the voltage that must be applied between pins B and C of the connector, it is possible to arrange the cable construction such that only segments of the cable length change colour or emit light. Such an arrangement is shown in FIG. 7. In this, segments of electrochromic or electroluminescent material 18 are connected together by longer low-resistance strips 20 of thick-film polymer. When energized, on the segments 18 of the cable will change colour or emit light as current is passed through.

The thermochromic, electrochromic or electroluminescent strip acts as a cheap flexible display element. It is suitable for use in many applications where a detailed display with many individual picture elements is not required. An example might be a system which guides a user through a building using floor tiles which incorporate a display strip around their edge. Location information from a fine-grain 3D tracker tells the building systems where the user is, and those systems selectively energize the display strips around the floor tiles in the direction in which the user should be progressing. After the user has passed, the building systems cease to energize those tiles, and the user is presented with a graphical display of the directions they should take.

While the invention has been shown and described above with reference to preferred embodiments, the foregoing other changes in form and detail may be made therein by one skilled in the art without departing from the spirit and scope of the invention which is to be defined only by the appended claims.

What is claimed is:

1. A cable including an outermost layer which is electrically activatable to change an appearance of the outermost layer, said outermost layer including a material having the appearance that is selectively changeable at least at selected locations therealong the outermost layer, at least primarily in response to said electrical activation applied directly to said outermost layer.

2. A cable according to claim 1 in which the outermost layer includes a layer of themochromic material formed on top of a resistive layer.

3. A cable according to claim 2 in which the layer is arranged in at least one strip along the length of the cable.

4. A cable according to claim 1 in which the outermost layer includes electrochromic material.

5. A cable according to claim 4 in which the layer is arranged in at least one strip along the length of the cable.

6. A cable according to claim 1 in which the outermost layer includes electroluminescent material.

7. A cable according to claim 6 in which the layer is arranged in at least one strip along the length of the cable.

8. A cable according to claim 1 in which the outermost layer is arranged in at least one strip along the length of the cable.

9. A cable according to claim 8 including at least one low resistance return path for electric current used to activate the material.

10. A connector for use with a cable according to claim 9 including a connector bar for connecting a strip of material to a return path and a pair of electrodes for applying current to a strip of material and a return path.

11. A cable according to claim 1 in which the outermost layer is arranged such that the material changes appearance only in particular areas.

12. A cable according to claim 11 wherein said layer includes an electrically conductive layer having higher resistance and lower resistance segments, the material changing appearance in segments of said layer for which said conductive layer has a higher resistance.

13. A cable according to claim 11 wherein said material is present in only segments of said layer.

14. A cable according to claim 13 wherein said layer includes a conductive layer formed of segments of said material separated by segments of a low resistance conductive material.

* * * * *